United States Patent [19]
Anderson

[11] Patent Number: 5,403,081
[45] Date of Patent: Apr. 4, 1995

[54] TOTE BIN COOLER

[76] Inventor: Richard J. Anderson, 916 S. 29th Ave., Yakima, Wash. 98902

[21] Appl. No.: 15,380

[22] Filed: Feb. 9, 1993

[51] Int. Cl.⁶ ............................ A47B 77/08; A47F 3/04
[52] U.S. Cl. ................................... 312/236; 312/290; 312/116; 312/249.8
[58] Field of Search .............. 312/236, 290, 36, 116, 312/272, 283, 249.8, 211; 62/378, 246; 221/150, 286

[56] References Cited

U.S. PATENT DOCUMENTS

| | | | |
|---|---|---|---|
| 1,307,261 | 4/1918 | Lee | 312/290 X |
| 2,125,444 | 9/1937 | Holderle et al. | 312/290 X |
| 2,345,792 | 4/1944 | Cann | 312/290 |
| 2,980,481 | 4/1961 | Fisher | 312/290 X |
| 3,091,504 | 5/1963 | Harnsberger | 312/290 X |
| 3,759,593 | 9/1973 | Walter | 312/290 X |
| 5,076,649 | 12/1991 | Therkelsen | 312/246 |

Primary Examiner—Kenneth J. Dorner
Assistant Examiner—Nancy Mulcare
Attorney, Agent, or Firm—Brady, O'Boyle & Gates

[57] ABSTRACT

A tote bin cooler for a produce filled tote bin to facilitate the handling, cooling and display of bulk shipped fresh produce at the point of sale. The tote bin cooler includes a refrigerated cabinet having an open side, provided with a removable closure, for receiving a produce filled tote bin supported on a pallet jack. A motor driven strap is connectable to the filled tote bin for pulling the produce filled bin off the pallet and into the cabinet. The tote bin is provided with a false or movable bottom engageable by an elevator mechanism positioned in the cooler for maintaining the level of the produce in the bin at a position near the top of the bin, so that the customer can see the produce when walking by the display area and can easily reach the produce in the bin.

7 Claims, 3 Drawing Sheets

TOTE BIN COOLER

BACKGROUND OF THE INVENTION

Packaging, shipping and handling fresh produce from the packing facility to the final point of sale, such as a supermarket, convenience store or produce market, requires a wide variety of containers and packaging materials designed to protect the merchandise and to allow marketing of the merchandise by size, grade and variety. Most of these containers are of a "bushel" size, weighing from 30 to 60 pounds, which can be hand-carried by an individual. Unfortunately, this variety of packaging materials is costly in terms of labor and materials, resulting in a reduced net profit to the grower of the merchandise.

To reduce the packaging and handling costs associated with "bushel" size containers, the fresh produce industry is now employing bulk packaging. The most common form of bulk packaging presently being used for the shipping of produce is the tote bin which comprises a corrugated paper container adapted to contain 600 pounds or more of produce. These tote bin containers may be randomly hand-packed with individual pieces of produce, or may be filled with bags of produce, or with layers of tray packed produce such as apples, pears, and the like. The tote bins are usually placed on shipping pallets adapted to be handled by fork lifts or pallet jacks and positioned in a display area of a store.

While these tote bins have been satisfactory for reducing the shipping and handling costs, and the quantity of packaging materials wasted by the conventional "bushel" sized containers, the produce in the bin in the display area at the final point of sale have experienced excess spoilage due to inadequate, or the complete lack of, cooling the bin in the display area.

Another disadvantage in the conventional tote bin produce containers is the difficulty experienced by a shopper reaching into the bottom of the bin to select a certain piece of produce.

SUMMARY OF THE INVENTION

To overcome the disadvantages experienced with conventional produce tote bins, the tote bin cooler of the present invention has been devised to facilitate the handling, cooling and display of bulk shipped fresh produce at the point of sale and comprises, essentially, a refrigerated cabinet having an open side adapted to receive a produce filled tote bin, the open side being provided with a removable closure such as hinged doors or a panel. A motor driven strap is connectable to the filled tote bin for pulling the tote bin from the shipping pallet into the cooler.

The tote bin is provided with a movable bottom engageable by an elevator mechanism positioned in the cooler, whereby the level of the produce in the bin can be kept at a position near the top of the bin, thereby making it easier for the customer to reach the produce and to see the produce when walking by the display area.

DESCRIPTION OF THE PREFERRED EMBODIMENT

Figure 1:
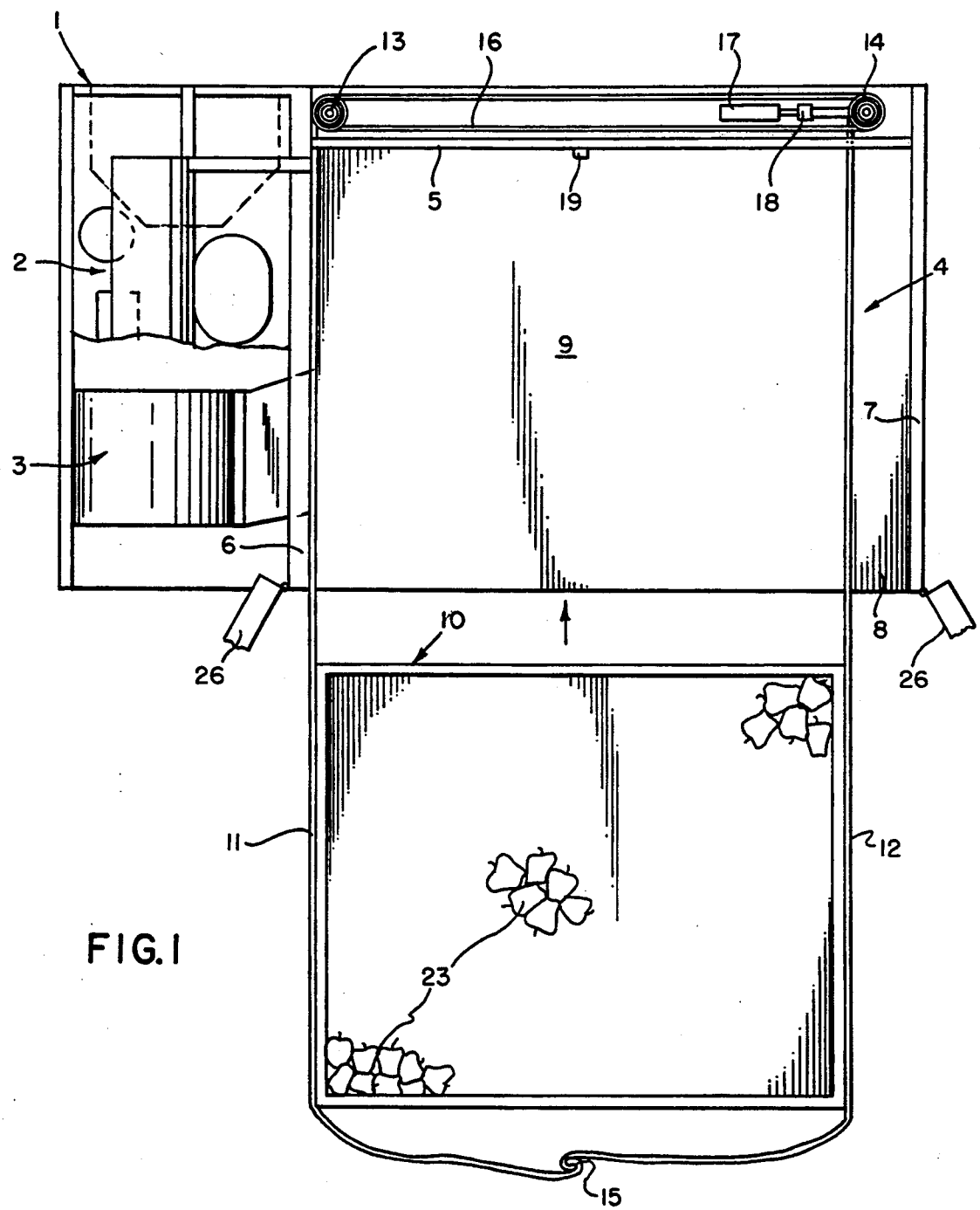
FIG. 1 is a top plan view of the cooler and tote bin showing the tote bin preparatory to being pulled into the cooler.

Referring to the drawings and more particularly to FIG. 1, a cooler 1 is provided having a housing for a refrigeration system 2 including a circulating fan 3 for conveying cool air to a compartment 4 of the cooler housing defined by a back wall 5, side walls 6 and 7, and a bottom wall or floor 8 having a center section 9 which functions as an elevator platform, to be described more fully hereinafter.

The front of the cooler 1 is open for receiving a standard size produce filled tote bin 10 approximately 42" wide, 48" long, and 26" high, or higher.

Figure 2:
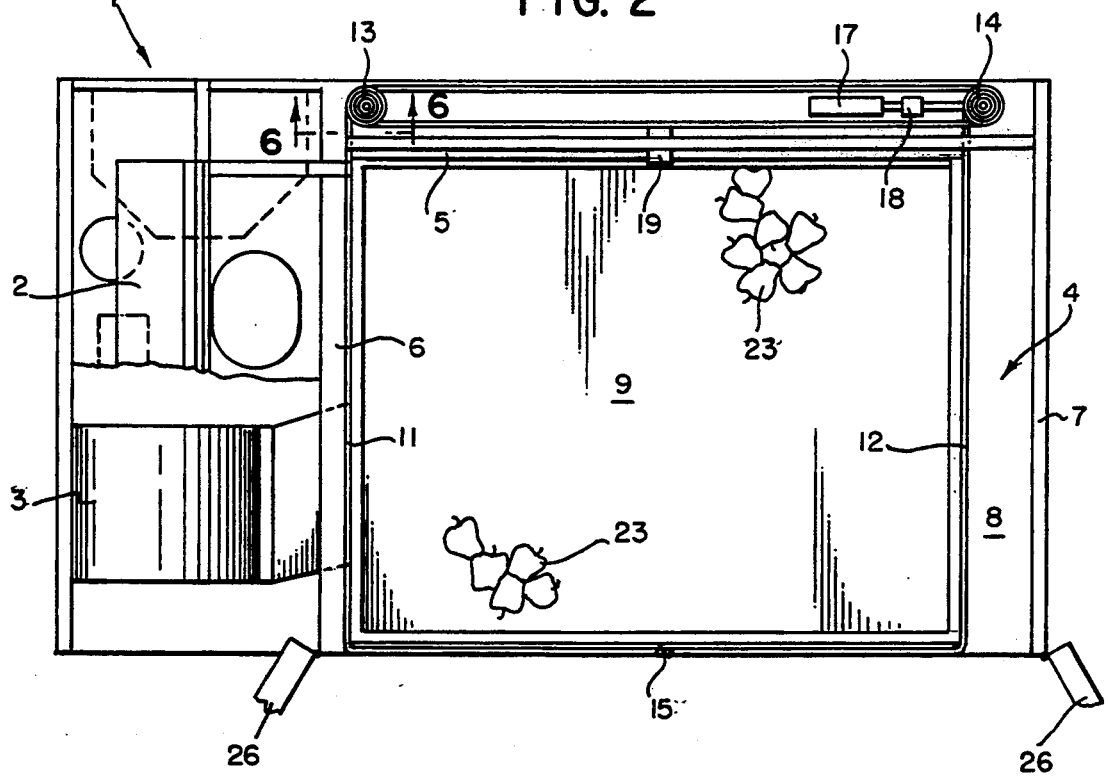
FIG. 2 is a top plan view showing the tote bin positioned in the cooler.
Figure 3:
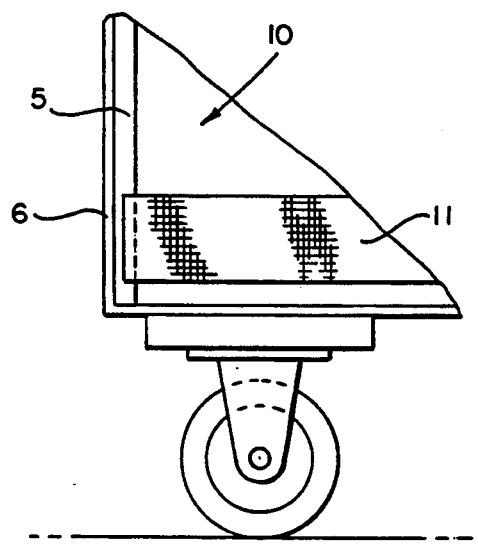
FIG. 3 is a fragmentary, side elevational view of a front lower corner of the tote bin having a strap extending therearound.

In order to position the tote bin 10 within the cooler compartment 4, a pair of straps 11 and 12 are provided having one end connected to a respective spool 13 and 14 rotatably mounted in the cooler housing, and the opposite end of the straps 11 and 12 being provided with cooperating fastener components 15. The spools are connected by a drive chain 16, whereby both spools 13 and 14 can be driven by a single drive motor 17 connected to the spool shaft through a clutch 18. The straps 11 and 12 are of a length to extend around the front of the tote bin 10 and when the drive belt motor 17 is actuated, the straps 11 and 12 become taut and pull the tote bin into the cooler compartment 4, as shown in FIG. 2. A switch 19 is provided on the back wall 5 of the compartment 4 which is adapted to be contacted by the back wall of the tote bin 10 to thereby de-energize the drive belt motor 17.

Figure 5:
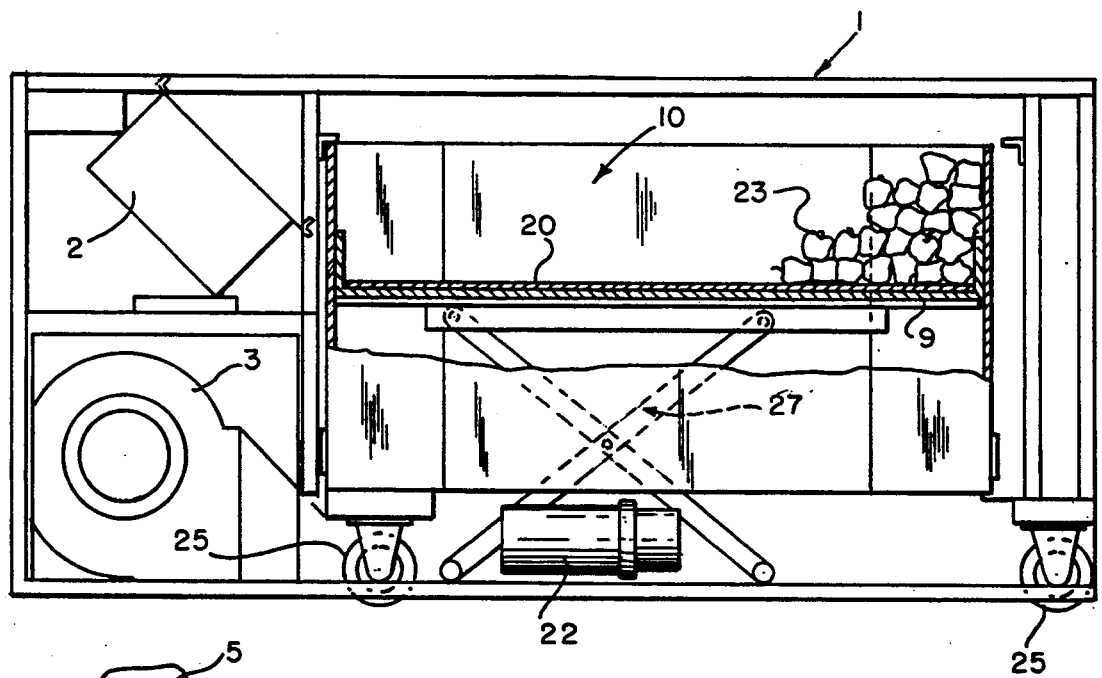
FIG. 5 is a side elevational view, partly in section, showing the tote bin positioned in the cooler and showing the bottom of the tote bin being raised by the cooler elevator mechanism.

As will be seen in FIG. 5, the tote bin 10 is provided with a movable bottom or floor 20 supported on the movable floor portion 9 of the cooler compartment 4, the floor portion 9 being moved by a scissors jack-type elevating mechanism 27 driven by an electric motor 22. By this construction and arrangement, as the level of produce in the tote bin drops, the elevating mechanism 27 can be periodically actuated to raise the bottom 20 of the tote bin to maintain the level of the produce 23 near the top of the bin, thereby making it easier for the customer to reach the produce.

To complete the structural details of the cooler, the movable floor section 9 of the compartment may be slotted or provided with an open roller assembly to enhance the flow of air from the fan 3 around the tote bin 10 and to facilitate the sliding of the tote bin across the floor 8 of the compartment 4.

Figure 6:
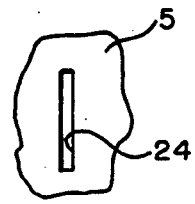
FIG. 6 is a fragmentary, front elevational view taken along line 6—6 of FIG. 2, showing one of the slots provided in the back wall of the cooler through which the bin pull strap extends.

Since the spools 13 and 14 and associated drive belt 16 are positioned in the cooler housing behind the back wall 5 of the compartment 4, as will be seen in FIG. 6, a slot 24 is provided in the back wall 5 through which the respective straps 11 and 12 extend to the spools 13 and 14.

Figure 4:
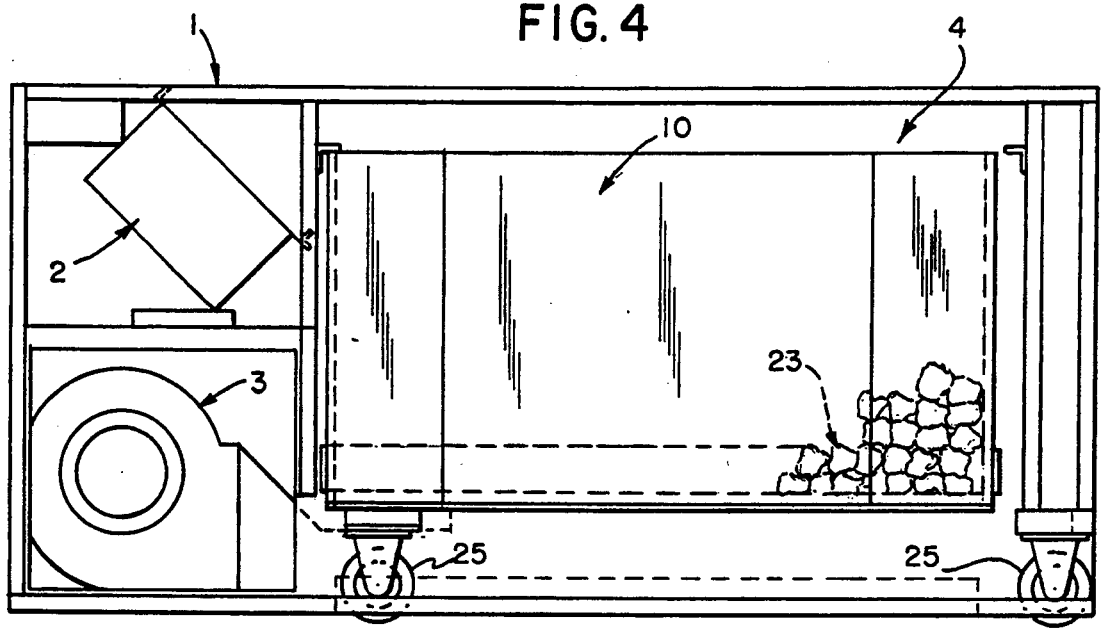
FIG. 4 is a side elevational view of the tote bin positioned in the cooler.

As will be seen in FIGS. 4 and 5, the cooler 1 is provided with caster wheels 25 to facilitate moving the cooler 1 to a desired display area in the store.

In use, the tote bin 10 is carried on a pallet and conveyed by a pallet jack to the open front of the cooler. The pallet is raised to position the bottom 20 of the tote bin 10 even with or slightly above the floor 8 of the compartment 4. The straps 11 and 12 and associated spools 13 and 14 are released from the drive motor 17 by the clutch 18, and are manually pulled from the spools 13 and 14 and wrapped around the tote bin 10 and fastened as at 15, as shown in FIG. 1. The drive motor 17 is then actuated causing the straps 11 and 12 to draw the tote bin 10 into the compartment 4 until the bin engages the stop switch 19.

When the tote bin is completely inside the compartment 4, the open front of the compartment can be closed by a removable closure 26 such as hinged doors or a panel which may be transparent to allow the customer to see the product label on the side of the tote bin.

While in the compartment 4, the produce 23 in tote bin 10 will be maintained at a cool temperature by the refrigeration system 2 and associated fan 3 to thereby prevent spoilage of the produce 23.

As the produce is removed from the tote bin 10 through the open top of the cooler 1 and the level of the produce 23 in the bin 10 drops, the elevator mechanism 27 is actuated to raise the bin bottom 20 so that the produce 23 remains near the top of the bin 10, thereby enabling the customer to see the produce 23 in the bin 10 when walking by the display area and to make it easier for the consumer to reach the produce 23.

While the cooler of the present invention has been described for receiving a tote bin, it will be understood by those skilled in the art that the cooler will readily accommodate stacked plastic trays containing the produce.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A tote bin cooler comprising, an open top refrigerated cabinet, a refrigeration system in said cabinet, a tote bin adapted to contain a saleable product, said refrigerated cabinet being positioned at a display area, said refrigerated cabinet having an open side perpendicular to said open top adapted for receiving the tote bin, means mounted in said cabinet for pulling said tote bin through said open side into the cabinet, whereby when a saleable product is in the bin it is cooled, to thereby prevent the spoilage thereof.

2. A tote bin cooler according to claim 1, wherein the means for pulling the filled tote bin into the cabinet comprises, strap means connected to said tote bin, and power driven wind-up means connected to said strap means, whereby when the power drive wind-up means is actuated the strap means is wound thereon while pulling the tote bin into the cabinet.

3. A tote bin cooler according to claim 2, wherein the strap means comprises, a pair of straps, the corresponding ends of each strap having cooperating fastener components for detachably connecting said ends of the straps, whereby the straps are adapted to extend around the bin and connected to each other, to thereby form a loop around the bin.

4. A tote bin cooler according to claim 3, wherein the power driven wind-up means comprises, a pair of spools, the opposite end of each strap being connected to a respective spool, a drive belt connected between said spools, and a motor operatively connected to one of said spools.

5. A tote bin cooler according to claim 1, wherein the tote bin has a movable bottom wall, elevator means mounted in said refrigerated cabinet and connected to the movable bottom wall of said tote bin, whereby the level of the produce in the bin can be maintained at a position near the top of the bin, thereby making it easier for the customer to reach the product and to see the product in the bin when walking by the display area.

6. A tote bin cooler according to claim 5, wherein the elevator means comprises a movable floor portion of said cabinet supporting the movable bottom wall of said bin, and a motor driven scissors jack-type elevating mechanism connected to said movable floor portion.

7. A tote bin cooler according to claim 1, wherein a removable closure is mounted on the side of the cabinet for closing the open side.

* * * * *